Feb. 3, 1970

A. P. IPRI 3,492,841

THREADED NUT LOCK

Filed July 17, 1968

INVENTOR.
ANTHONY P. IPRI

BY *[signature]*

ATTORNEY.

United States Patent Office 3,492,841
Patented Feb. 3, 1970

3,492,841
THREADED NUT LOCK
Anthony P. Ipri, 2535 Lloyd St.,
Philadelphia, Pa. 19142
Filed July 17, 1968, Ser. No. 745,430
Int. Cl. F16b 23/00, 37/14, 41/00
U.S. Cl. 70—231                              1 Claim

ABSTRACT OF THE DISCLOSURE

This invention is directed to protection against theft or other unauthorized removal of articles secured by threaded nuts or the like through provision of auxiliary nuts and rotatable housings therefor adapted to enclose the securing nuts and prevent their removal except after interlocking of the housing and auxiliary nut through the instrumentality of a distinctive and not readily duplicated key element and removal of the auxiliary nut to afford access to the securing one.

BACKGROUND OF THE INVENTION

Field of the invention

In many areas in which by custom or through necessity automobiles are left unattended in relatively deserted places thefts of automobile wheels frequently occur, encouraged by the interchangeability of wheels among different models and the products of different manufacturers and in efforts to reduce this trend there have been developed numerous kinds of locking devices designed to make difficult unauthorized removal of wheels from the vehicles to which they are attached including the provision of key elements of various kinds to facilitate authorized removal when appropriate.

The prior art

Prior art of which I am aware includes U.S. Letters Patent 2,978,896, granted Apr. 11, 1961 to John V. Saccone for Combination Hub Cap and Air Valve Lock disclosing a locking mechanism which, while not specifically directed to means for protecting the nuts securing a wheel to a vehicle, does provide in effect a nut and a protective housing or "outer shield element" therefore relatively rotatable thereon and adapted to be secured against relative rotation by introduction of a key-like element. This lock while in appearance suggesting adequate security against unauthorized removal of the decorative hub cap or tampering with the air valve of a tire on the wheel with which it is associated is in fact readily rendered ineffective as a theft prevention device due to the facility with which a great variety of blade type instruments may be utilized to effect interlocking of the shield and nut to permit removal of the latter from the valve-stem or other threaded element with which it may be associated. Moreover, as the nut contained within the shield is itself the securing nut, to set the latter up with a wrench to the extent required, for example of wheel lug nuts, would entail transmission through the key element of the entire force involved in this operation.

SUMMARY OF THE INVENTION

In accordance with this invention the standard wheel or lug nuts on the usual lug bolts are employed to secure the wheels to the hubs, or to a spare wheel bracket when desired, and these nuts can therefore be set up in the usual way and thus, as is normal, in such manner as to allow a few threads on the bolt to extend outwardly beyond the nut. The auxiliary nut embodying my invention when used in this environmen its designed to be threaded on these few projecting threads of the lug bolt after the securing nut has been set up thereon, the outer housing enclosing the auxiliary nut including a cylindrical skirt surrounding the auxiliary nut and the lug nut to inhibit application to it of a wrench or the like.

The key element embodying the invention is substantially cylindrical and comprises segmental fingers paralleling its axis and adapted to enter apertures in the housing end closure and to engage in auxiliary nut slots whereby the nut may be actuated, the apertures and slots being so designed in each lock as to be unique in circumferential spacing, arcuate subtention, or both and the key being complementary thereto, whereby the chances of a key designed and intended for operating one lock being capable of operating a lock for which it was not intended are reduced to a minimum.

DESCRIPTION OF THE PREFERRED EMBODIMENT

Figure 1:
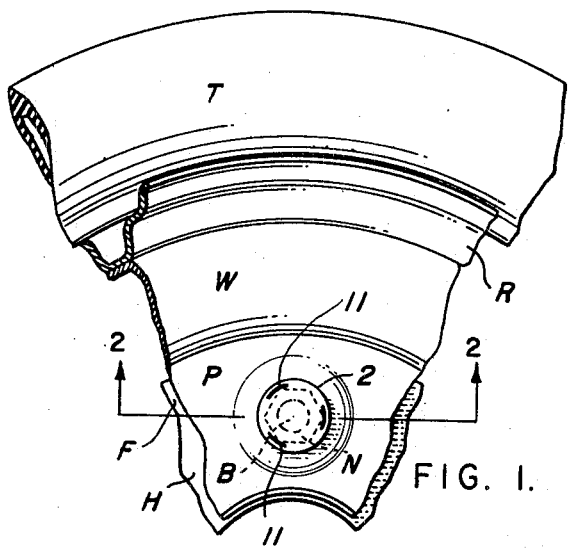
FIG. 1 is a fragmentary front elevation of a typical automotive vehicle wheel showing a locking device embodying the invention in operative association with a wheel lug bolt and securing nut thereon which maintains the wheel assembled with its hub.
Figure 3:
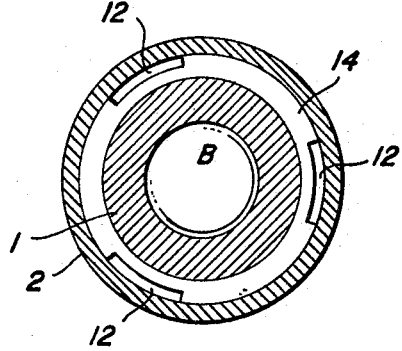
FIG. 3 is an enlarged transverse section of the lock on line 3—3 in FIG. 2.
Figure 4:
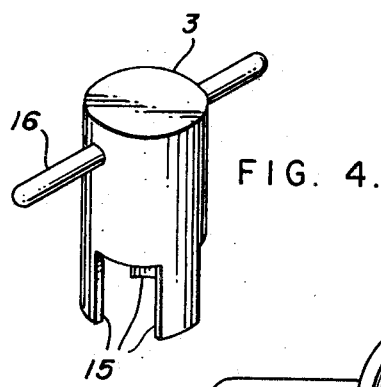
FIG. 4 is a perspective view of a key element designed to actuate the locking mechanism shown in the preceding figures.

The preferred embodiment of the invention illustrated in the drawing comprises in general three principal components, to wit: auxiliary nut 1, outer housing 2 and detachable key element 3. Nut 1 carries internal threads 5 complementary to the threads on the lug bolt B or the like on which is threaded the securing nut N which the locking device is designed to protect. As shown in FIG. 1 bolt B extends through the flange F of wheel hub H and the plate P of wheel W on the outer rim R of which is mounted a tire T. The auxiliary nut 1 except for slots hereinafter more fully described is externally cylindrical, coaxially with internal threads 5 and is chamfered at its inner edge 6 to accommodate an inwardly directed rib 8 carried by the cylindrical skirt 9 of housing 2.

Figure 2:
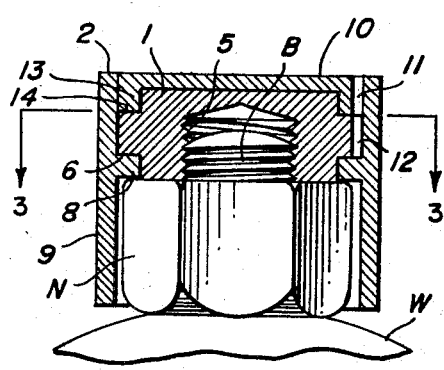
FIG. 2 on an enlarged scale is a diametral section on line 2—2 in FIG. 1 more clearly illustrating the internal structure of my locking device.
Figure 5:
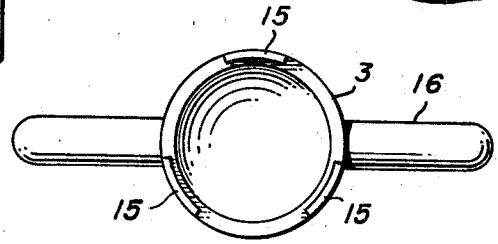
FIG. 5 is an end view of said key element.

The outer end of housing 2 is closed by a flat circular plate 10 sweated or press fitted into the end of the housing having a series of arcuate apertures 11 adjacent its edge adapted to be aligned respectively with slots 12 in the outer periphery of nut 1 and a depending skirt 13 entering an outer chamfer 14 in nut 1; rib 8 and chamfer 14 thus embrace the nut in relatively rotatable coaxial relation therewith. It will be observed in FIG. 2 that the lower edge of skirt 9 closely approaches the adjacent surface of wheel W when the locking device is in locking relation thereon, which inhibits the insertion of a tool beneath the skirt for forcibly attempting to release the lock.

Apertures 11 and slots 12 may be of any desired number, for example as in the embodiment illustrated three of each, subtending equal arcs and equidistantly spaced circumferentially of housing 2 and nut 1 but it is usually deemed advisable they subtend unequal arcs, be non-uniformly spaced and their circumferential spacing be slightly different, in each locking device, from that in most if not all others. Key 3 which is removable from the locking device and normally kept in a safe place apart from the latter when not in use has a plurality of arcuate fingers 15 paralleling its axis and spaced therefrom a distance corresponding to the radial spacing of the apertures in the housing and slots in the nut from the axis of the matching locking device. Fingers 15 are moreover circumferentially spaced and of arcuate subtention to correspond to and complement said apertures and slots whereby when the latter are aligned they may be entered by said fingers and the nut 1 thereby rotated through the instrumentality of the key, which preferably has a transversely extending operating bar 16 projecting oppositely outward from its body to facilitate its manipulation.

Figure 6:
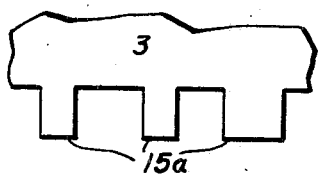
FIGS. 6, 7 and 8 are diagrammatic representations of the linear development of other arrangements of fingers and intervening key spaces.
Figure 7:
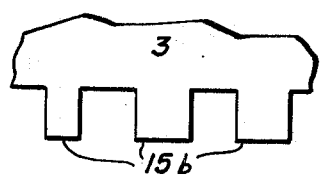
Figure 8:
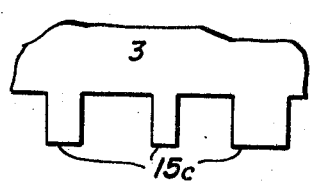

While the embodiment of the invention illustrated in FIGS. 1-5 of the drawing comprises a key having fingers 15 complementing apertures 11 in the housing and slots 12 in the nut at circumferentially uniformly spaced intervals and subtending equal arcs, it will be appreciated that the invention contemplates relatively infinite variation in both these factors whereby the possibility of any given key fitting a locking device other than that for which it was intended is minimized. Thus I have diagrammatically illustrated in FIGS. 6, 7 and 8 a random selection of modifications of the arcuate extent and spacing of fingers 15a, 15b, 15c of different key elements, as indicated developed from normal cylindrical form to linear diagrams for facilitating full disclosure of the invention. As illustrated in FIG. 6, therefore, two of the fingers 15a subtend arcs narrower than the third but are substantially equal to each other; in FIG. 7 two of the fingers 15b are wider than the third although substantially equal to each other, while in FIG. 8 each of the three fingers 15c subtends an arc different from the other two, and modifications of this nature accordingly make available a great variety of specifically different keys. Additional variety is available also through the different circumferential spacing of the interlocking elements' apertures and slots and the key fingers.

In accordance with customary procedures it will normally be deemed advisable for the manufacturer to keep a record of the pattern of the fingers of each key produced and to identify the locking device by a number or other code designation applied to it and to the distinctive key designed for cooperation with it; this enables lost keys to be readily replaced by authorized acquisition without enabling unauthorized persons to secure keys indiscriminately for tampering with the locking devices. It will be noted the apertures in the housing are desirably small enough to inhibit easy observation of their alignment with the subjacent slots which adds to the difficulties confronting an unauthorized person attempting to tamper with the locking device or to actuate it with the aid of instrumentalities other than the key designed for the purpose.

While I have herein described with considerable particularity certain embodiments of the invention it will be recognized other embodiments may come within its purview and that changes in the form, construction, arrangement and relationships of the several parts and components will readily occur to those skilled in the art and may be utilized if desired.

I claim:
1. A locking device for an internally threaded element having an externally threaded element extending therethrough comprising an auxiliary nut adapted to be threaded onto said externally threaded element to engage said internally threaded element, a housing surrounding said nut relatively rotatable thereon having a substantially cylindrical hollow skirt containing said internally threaded element when said nut is threaded on said externally threaded element and in engagement with said internally threaded element and a substantially flat end closure for said housing overlying said nut, said end closure and said nut having respectively apertures and slots paralleling the common axis of said end closure and nut adapted to register when said end closure and nut are in one position of relative rotation and a substantially cylindrical key element having circumferentially spaced peripheral fingers paralleling its axis complementary to said slots and adapted to enter thereinto through said apertures for releasably securing said nut and said housing for unitary rotation relative to said externally threaded element said slots subtending unequal angles at said common axis and being unequally spaced circumferentially about said axis and said apertures containing voids subtending respectively like equal angles at said axis, said voids being circumferentially spaced about said axis congruently with said apertures when said end closure and nut are in said position for reception of said fingers of the key element through said apertures and into said slots.

References Cited

UNITED STATES PATENTS

| 873,009 | 12/1907 | Baxter | 85—45 |
| 1,088,046 | 2/1914 | Turner | 85—45 |
| 1,397,876 | 11/1921 | Meldal | 85—45 |
| 2,032,281 | 2/1936 | Haywood | 85—35 |
| 2,179,045 | 11/1939 | Lewis | 85—45 |
| 2,286,950 | 6/1942 | Breedlove | 85—45 |
| 2,456,234 | 12/1948 | Young | 85—35 |
| 2,653,835 | 9/1953 | Nelson | 85—35 |
| 2,978,896 | 4/1961 | Saccone | 70—231 |

FOREIGN PATENTS

| 59,739 | 5/1942 | Denmark. |
| 771,698 | 7/1934 | France. |
| 15,653 | 5/1953 | Germany. |
| 480,235 | 4/1953 | Italy. |

MARION PARSONS, JR., Primary Examiner

U.S. Cl. X.R.

85—35, 45; 145—50.1